US007773185B2

(12) United States Patent
Bae et al.

(10) Patent No.: US 7,773,185 B2
(45) Date of Patent: Aug. 10, 2010

(54) THIN FILM TRANSISTOR ARRAY PANEL AND DISPLAY APPARATUS HAVING THE SAME

(75) Inventors: Sung-Hwan Bae, Asan-si (KR); Kyung-Wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 11/846,234

(22) Filed: Aug. 28, 2007

(65) Prior Publication Data

US 2009/0009458 A1 Jan. 8, 2009

(30) Foreign Application Priority Data

Jul. 4, 2007 (KR) ..................... 10-2007-0066964

(51) Int. Cl.
*G02F 1/1343* (2006.01)
*G02F 1/136* (2006.01)
*G09G 3/36* (2006.01)

(52) U.S. Cl. ......................... 349/144; 349/48; 349/139; 345/92

(58) Field of Classification Search ................. 349/144, 349/147; 345/92

See application file for complete search history.

(56) References Cited

U.S. PATENT DOCUMENTS 7,532,269 B2 * 5/2009 Ahn ............................ 349/43
2006/0215066 A1 * 9/2006 Ueda et al. .................... 349/38
2008/0024689 A1 * 1/2008 Ahn ............................ 349/43
2008/0055292 A1 * 3/2008 Do et al. ..................... 345/204
2008/0186304 A1 * 8/2008 You et al. .................. 345/212
2008/0198290 A1 * 8/2008 Su et al. ....................... 349/48
2008/0204613 A1 * 8/2008 Kim et al. ..................... 349/33
2009/0009458 A1 * 1/2009 Bae et al. ...................... 345/92

* cited by examiner

*Primary Examiner*—Michelle R Connelly Cushwa
(74) *Attorney, Agent, or Firm*—H.C. Park & Associates, PLC

(57) ABSTRACT

A thin film transistor (TFT) array panel and a display device having the same are provided. The TFT array panel includes a substrate, an n−1th and an nth gate line formed on the substrate, a data line intersected with the n−1th gate line, a first source electrode overlapped with at least one portion of the n−1th gate line and connected to the data line, a first and a second drain electrode overlapped with at least one portion of the n−1th gate line and facing the first source electrode, a first sub pixel electrode electrically connected to the first drain electrode, a second sub pixel electrode electrically connected to the second drain electrode, a second source electrode overlapped with at least one portion of the nth gate line and electrically connected to the second sub pixel electrode, a third drain electrode overlapped with at least one portion of the nth gate line and facing the second source electrode, a third source electrode overlapped with at least one portion of the nth gate line, a fourth drain electrode overlapped with at least one portion of the nth gate line and facing the third source electrode, a third sub pixel electrode electrically connected to the fourth drain electrode; and a fourth sub pixel electrode capacitively coupled with the third sub pixel electrode.

20 Claims, 6 Drawing Sheets

THIN FILM TRANSISTOR ARRAY PANEL AND DISPLAY APPARATUS HAVING THE SAME

CROSS-REFERENCE TO RELATED APPLICATION

This application claims priority to and the benefit of Korean Patent Application No. 10-2007-0066964 filed in the Korean Intellectual Property Office on Jul. 4, 2007, the entire contents of which are incorporated herein by reference.

BACKGROUND (a) Field of the Invention

The present invention relates to a display device, more precisely a display device to improve the visibility and display quality.

(b) Description of the Related Art

A liquid crystal display (LCD) is one of the most widely used flat panel displays. An LCD includes two substrates on which electrodes are formed and a liquid crystal layer that is interposed there between. When a voltage is applied to the electrodes, the electric field is generated and the liquid crystal molecules are re-arranged. The polarizers and liquid crystal molecules control the amount of the transmittance of the light to display images.

In the vertical alignment mode (VA mode), when the voltage is not applied to the electrodes, the long axes of the liquid crystal molecules are vertically aligned to the substrate. The LCD of the VA mode has a high contrast ratio allowing for a wide viewing angle. To achieve a wide viewing angle in the VA mode, a protrusion or aperture is formed on the electrode.

To improve visibility, one pixel electrode is divided into two sub pixel electrodes displaying different gray levels. Many methods are used to display different gray levels in the sub pixel electrodes. One method is to apply the same voltage to two sub pixel electrodes and to share the charges between the two sub pixel electrodes. As a result, the voltage level of one sub pixel electrode is high and the voltage level of the other sub pixel electrode is low. In such a method, one pixel region is controlled by two gate lines. But on the last line, one gate line runs short so a voltage difference between the sub pixel electrodes does not arise. As a result, the pixel electrodes of the last line may be brighter than the pixel electrodes of other lines.

SUMMARY

The present invention relates to a display device, more precisely a display device to improve the visibility by preventing the pixel electrodes of the last line from being brighter than the other pixel electrodes.

A TFT array panel according to an embodiment of the present invention may include a substrate; an n−1th and an nth gate line formed on the substrate; a data line intersected with the n−1th gate line; a first source electrode overlapped with at least one portion of the n−1th gate line and connected to the data line; a first and a second drain electrode overlapped with at least one portion of the n−1th gate line and facing the first source electrode; a first sub pixel electrode electrically connected to the first drain electrode; a second sub pixel electrode electrically connected to the second drain electrode; a second source electrode overlapped with at least one portion of the nth gate line and electrically connected to the second sub pixel electrode; a third drain electrode overlapped with at least one portion of the nth gate line and facing the second source electrode; a third source electrode overlapped with at least one portion of the nth gate line; a fourth drain electrode overlapped with at least one portion of the nth gate line and facing the third source electrode; a third sub pixel electrode electrically connected to the fourth drain electrode; and a fourth sub pixel electrode capacitively coupled with the third sub pixel electrode.

A display device according to an embodiment of the present invention may include a first substrate; an n−1th and an nth gate line formed on the first substrate; a first source electrode overlapped with at least one portion of the n−1th gate line and connected to a data line; a first and a second drain electrode overlapped with at least one portion of the n−1th gate line and facing the first source electrode; a first sub pixel electrode electrically connected to the first drain electrode; a second sub pixel electrode electrically connected to the second drain electrode; a second source electrode overlapped with at least one portion of the nth gate line and electrically connected to the second sub pixel electrode; a third drain electrode overlapped with at least one portion of the nth gate line and facing the second source electrode; a third source electrode overlapped with at least one portion of a kth gate line; a fourth drain electrode overlapped with at least one portion of the kth gate line and facing the third source electrode; a third sub pixel electrode electrically connected to the fourth drain electrode; a fourth sub pixel electrode capacitively coupled with the third sub pixel; a second substrate facing the first substrate; and a common electrode formed on the second substrate.

A display device according to an embodiment of the present invention may include a first substrate; an n−1th and an nth gate line formed on the first substrate; a first and a second thin film transistor (TFT) controlled by the n−1th gate line; a third TFT controlled by the nth gate line; a fourth TFT controlled by the nth gate line; a first sub pixel electrode electrically connected to the output of the first TFT; a second sub pixel electrode electrically connected to an output of the second TFT and an input of the third TFT; a third sub pixel electrode electrically connected to an output of the fourth TFT; a fourth sub pixel electrode capacitively coupled with the third sub pixel electrode; a second substrate; and a liquid crystal layer interposed between the first and the second substrate.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Figure 1:
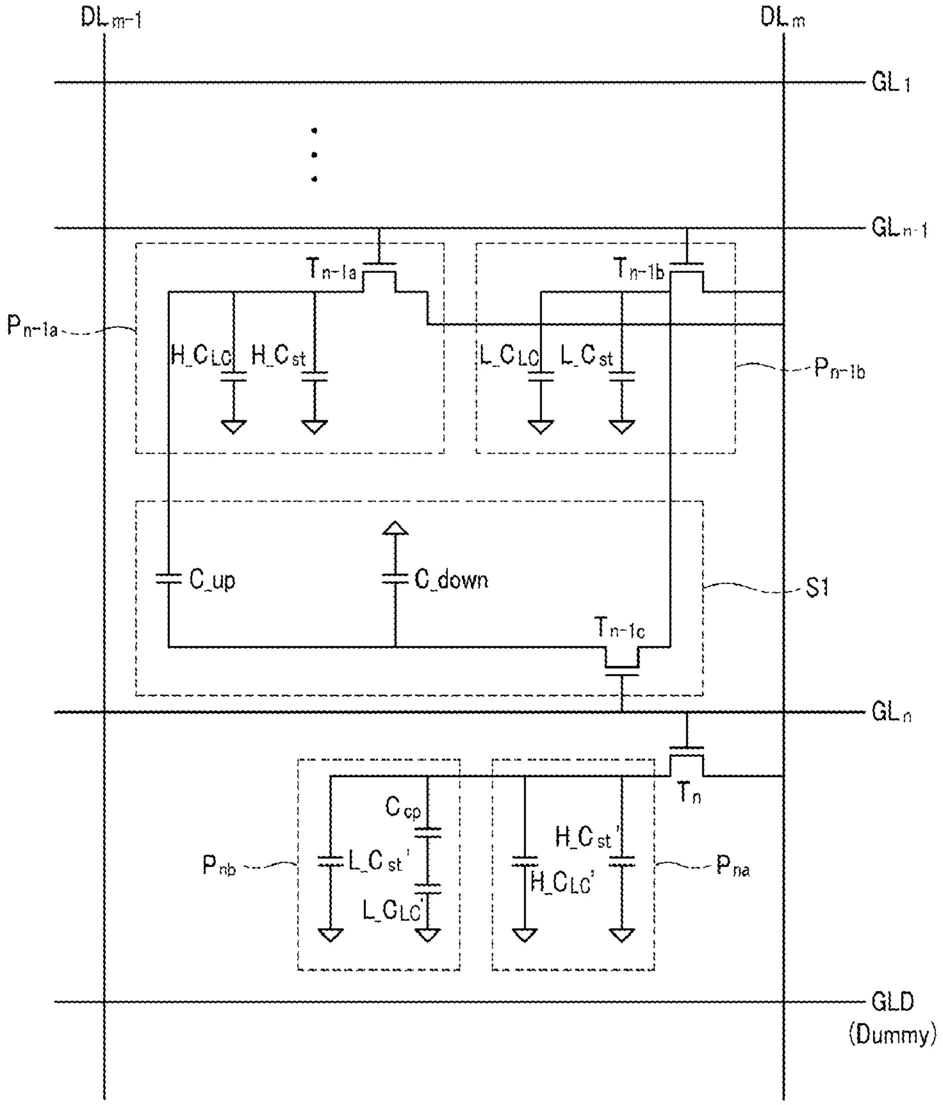
FIG. 1 shows a circuit diagram of an embodiment of the present invention.

Hereinafter, embodiments of the present invention will be described in detail with reference to the accompanying drawings so as to be easily understandable to those skilled in the art. As those skilled in the art will realize, the described embodiments may be modified in various ways, all without departing from the spirit or scope of the present invention.

To clarify multiple layers and regions, the thicknesses of the layers may be enlarged in the drawings. Like reference numerals designate like elements throughout the specification. When it is said that any part, such as a layer, film, area, or plate is positioned on another part, it means the part may be directly on the other part or above the other part with at least one intermediate part. On the other hand, if any part is said to be positioned directly on another part it means that there is no intermediate part between the two parts.

A circuit diagram of an embodiment of the present invention will now be described in detail with reference to FIG. 1 and FIG. 2.

FIG. 1 shows a circuit diagram of an embodiment of the present invention. FIG. 2 shows a connection between the gate lines of an embodiment of the present invention.

Figure 2:
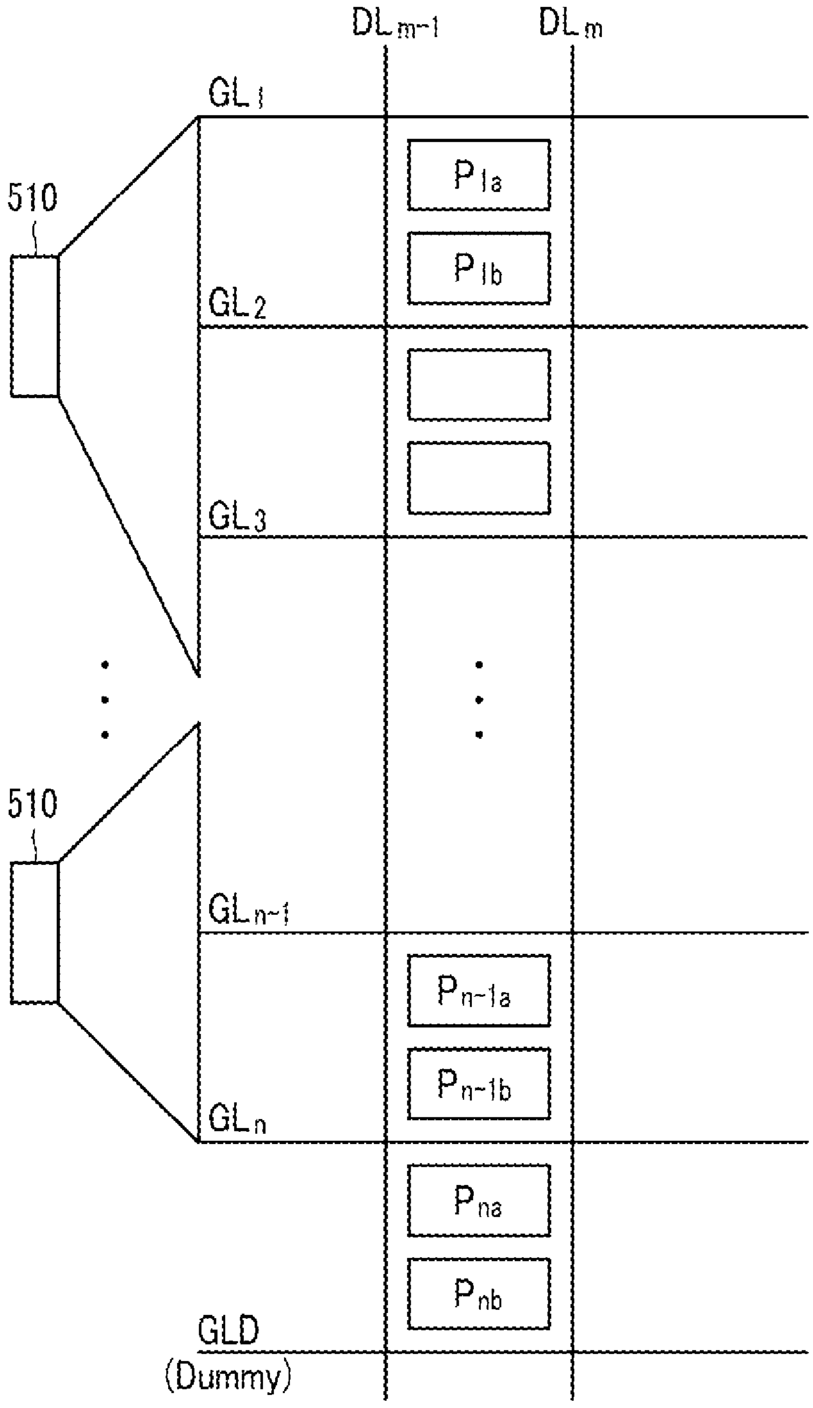
FIG. 2 shows a connection between the gate lines of an embodiment of the present invention.

Referring to FIG. 1 and FIG. 2, a display device of the present invention includes the first to the nth gate lines (GL1~GLn), the m−1th data line (DLm−1), the mth data line (DLm) and a dummy gate line (GLD, dummy). The dummy gate line (GLD, dummy) isn't connected to gate driving parts (510) and doesn't receive a gate signal.

Referring to FIG. 1, the display device of an embodiment of the present invention, the nth pixel region is formed at the last line. Each pixel region includes two sub pixel regions (Pa, Pb) including each sub pixel electrode. The n−1th pixel region includes the n−1th sub pixel region A (Pn-1*a*) and the n−1 sub pixel region B (Pn-1*b*). The nth pixel region includes the nth sub pixel region A (Pna) and the nth sub pixel region B (Pnb).

The n−1th sub pixel region A (Pn-1*a*) includes the n−1th thin film transistor A (TFT, Tn-1*a*), the n−1th liquid crystal (LC) capacitor A (H-Clc) and the n−1th storage capacitor A (H-Cst). The n−1th sub pixel region B (Pn-1*b*) includes the n−1th TFT B (Tn-1*b*), the n−1th LC capacitor B (L-Clc) and the n−1th storage capacitor B (L-Cst).

The n−1th TFT A (Tn-1*a*) includes the n−1th gate electrode A connected to the n−1th gate line (GLn−1), the n−1th source electrode A connected to the mth data line (DLm) and n−1th drain electrode A. The n−1th drain electrode A is electrically connected to the n−1th sub pixel electrode A and the n−1th LC capacitor A (H-Clc) is defined by the n−1th sub pixel electrode A, a common electrode and an insulating layer there between. The n−1th storage capacitor A (H-Cst) is defined by the n−1th sub pixel electrode A, a storage electrode and an insulating layer there between.

The n−1th TFT B (Tn-b) includes the n−1th gate electrode B connected to the n−1th gate line (GLn−1), the n−1th source electrode B connected to the mth data line (DLm) and the n−1 drain electrode B. The n−1th drain electrode B is electrically connected to the n−1th sub pixel electrode B and the n−1th LC capacitor B (L-Clc) is defined by the n−1th sub pixel electrode B, a common electrode and an LC layer there between. The n−1th storage capacitor B (L-Cst) is defined by the n−1th sub pixel electrode B, a storage electrode and an insulating layer there between.

The n−1th gate electrode A and the n−1th gate electrode B may be formed continuously and the n−1th source electrode A and the n−1th source electrode B may be formed continuously.

The n−1th pixel region additionally includes a voltage control part(S) to including the n−1th TFT C (Tn-1*c*), the n−1th voltage up capacitor (C_up) and the n−1th voltage down capacitor (C_down). The n−1th TFT C (Tn-1*c*) includes the n−1th gate electrode C connected to the nth gate line (GLn), the n−1th source electrode C and the n−1th drain electrode C. The n−1th source electrode C is electrically connected to the n−1th sub pixel electrode B. The n−1th drain electrode C is partially overlapped with the storage electrode to form the n−1th voltage down capacitor (C_down) and the n−1th drain electrode C is partially overlapped with the n−1th sub pixel electrode A to form the n−1th voltage up capacitor (C_up).

The nth pixel region includes the nth sub pixel region A (Pna), the nth sub pixel region B (Pnb) and the nth TFT (Tn). The nth sub pixel region A (Pna) includes the nth LC capacitor A (H-Clc') and the nth storage capacitor A (H-Cst'). The nth sub pixel region B (Pnb) includes the nth LC capacitor B (L-Clc'), the nth storage capacitor B (L-Cst') and a coupling capacitor (Ccp).

The nth TFT (Tn) includes the nth gate electrode connected to the nth gate line (GLn), the nth source electrode connected to the mth data line (DLm) and the nth drain electrode. The nth drain electrode is electrically connected to the nth sub pixel electrode A. The nth LC capacitor A (H-Clc') is defined by the nth sub pixel electrode A, a common electrode facing the nth sub pixel electrode A and an LC layer their between. The nth storage capacitor A (H-Cst') is defined by the nth sub pixel electrode A, a storage electrode and an insulating layer their between.

At the nth sub pixel region B (Pnb), the nth sub pixel electrode B is partially overlapped with the nth drain electrode to form the coupling capacitor (Ccp). The coupling capacitor (Ccp) is defined by the nth sub pixel electrode B, the nth drain electrode and an insulating layer there between. The nth LC capacitor (L-Clc') is defined by the nth sub pixel electrode B, a common electrode facing the nth sub pixel electrode B and an LC layer there between. The nth storage capacitor B (L-Cst') is defined by the nth sub pixel electrode B, a storage electrode and an insulating layer there between.

Figure 3:
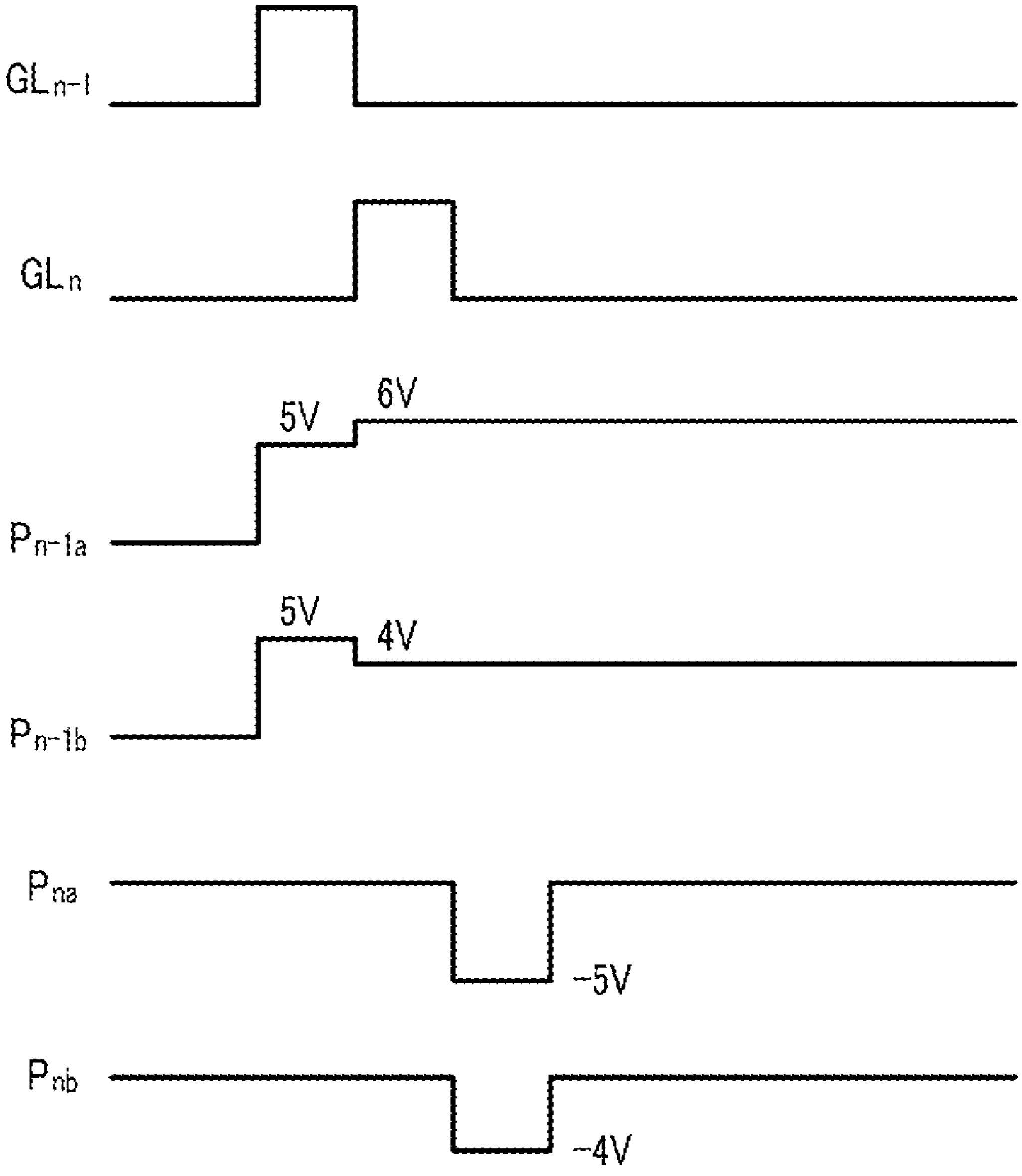
FIG. 3 shows the voltage variance of the pixel electrode in accordance with the gate signal.

Referring to FIG. 3, the voltage variance of the pixel electrode in accordance with the gate signal will now be described in detail.

It is understood to those skilled in the art that the storage electrode line and the common electrode receive 0V of common voltage (Vcom), the n−1th pixel region receives 5V of data signal, and the n−1th pixel region receives to −5V of data signal.

When the n−1th gate signal is applied to the n−1th gate line (GLn−1), the n−1th TFT A (Tn-1*a*) and n−1th TFT B (Tn-1*b*) turn on and 5V of data signal is applied to the n−1th sub pixel electrode A and the n−1th sub pixel electrode B.

When the nth gate signal is applied to the nth gate line (GLn), the n−1th TFT C (Tn-1*c*) turns on and the voltage level of the n−1th sub pixel electrode B is low (ex. 4V) and voltage level of the n−1th sub pixel electrode A is high (ex. 6V). Because the n−1th sub pixel electrode B is electrically connected to the source electrode of the n−1th TFT C (Tn-1*c*) and the n−1th voltage up capacitor (C_up) and the n−1th voltage down capacitor (C_down) are formed. By the n−1th voltage up capacitor (C_up) and the n−1th voltage down capacitor (C_down), the voltage level of the n−1th sub pixel electrode A and the n−1th sub pixel electrode B is controlled. The amount of level up and down is determined by the n−1th voltage up capacitor (C_up) and the n−1th voltage down capacitor (C_down).

When the nth gate signal is applied to the nth gate line (GLn), the nth TFT (Tn) also turns on. At this time, for example −5V of data signal is applied to the nth sub pixel electrode A. The nth sub pixel electrode B is not electrically connected to the nth drain electrode and forms coupling capacitor (Ccp) with the nth drain electrode. So the level down voltage (ex. −4V) is applied to the sub pixel electrode B.

In an embodiment of the present invention, to apply different voltages to two sub pixel electrodes in one pixel region, the same voltage is applied to two sub pixel electrodes and the charges are shared between the two sub pixel electrodes. The two sub pixel electrodes are capacitively coupled with each other at the last line thereby preventing the last line of the pixel electrodes from being brighter than other lines.

Now, a TFT array panel of an embodiment of the present invention will now be described in detail with reference to FIG. 4, FIG. 5 and FIG. 6.

Figure 4:
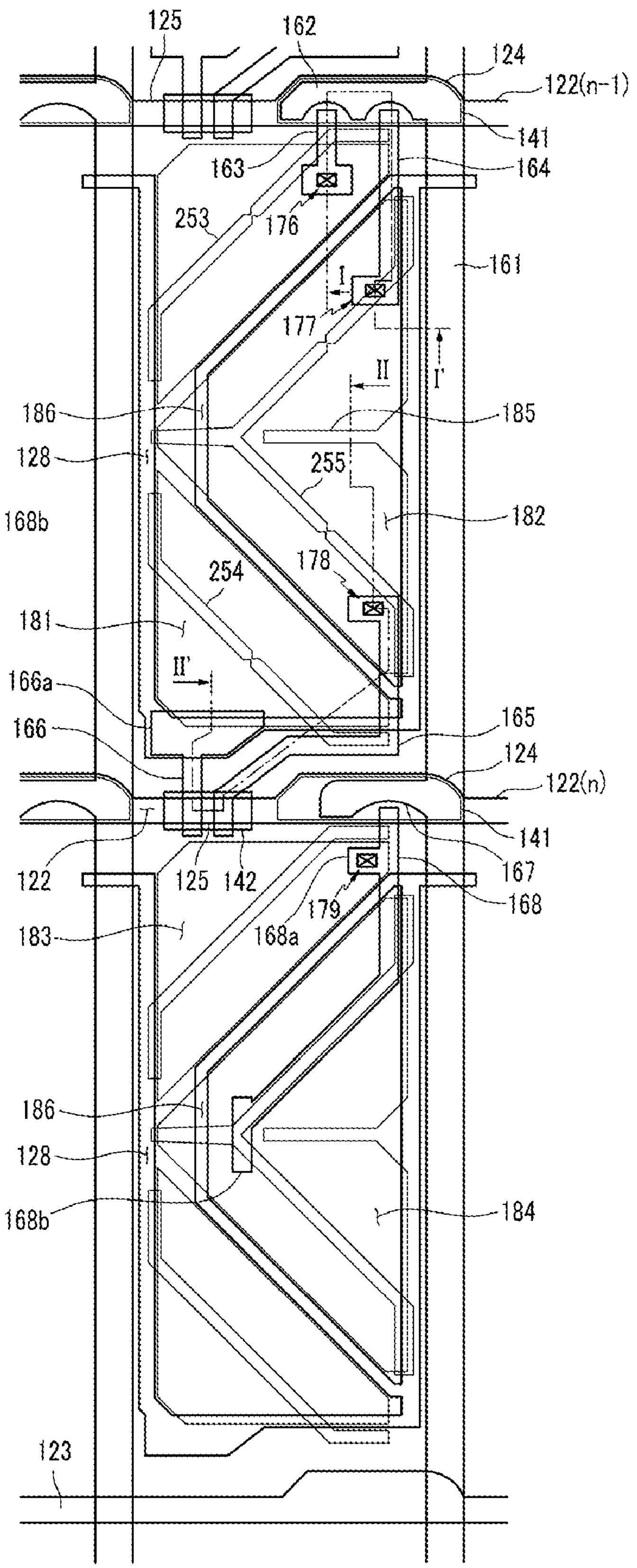
FIG. 4 shows a layout view of a display device of an embodiment of the present invention.

FIG. 4 shows a layout view of a display device of an embodiment of the present invention. FIG. 5 is a cross-sectional view taken along the line I-I of the display device of FIG. 4. FIG. 6 is a cross-sectional view taken along the line II-II' of the display device of FIG. 5.

A TFT array panel 100 includes a first substrate 110. The first substrate 110 may be made of plastic or transparent glass. Gate lines 122 are formed on the first substrate 110 and mainly extend to the horizontal direction. The number of the gate lines 122 transmitting gate signals corresponds to the number of pixel regions. The gate lines 122 are formed at an upper part of a pixel region. That is to say, the first gate line 122 is formed at the upper part of the first pixel region and the nth gate line 122 is formed at the upper part of the nth pixel region. The dummy gate line 123 may be formed at the lower part of the nth pixel region but in general, the number of the channel of the gate driving parts (now shown) is “N” (N means natural number) and corresponds to the number of pixel regions so the gate signal may not be applied to the dummy gate line 123.

The gate lines 122 include the first gate electrodes 124 and the second gate electrodes 125. In an embodiment of the present invention, the first gate electrode 124 protrudes from the gate line 122 and is formed at one region of the gate line 122 and the second gate electrode 125 is formed at the other region of the gate line 122. The shape and location of the first and the second gate electrode 124, 125 may be transformed.

The first gate electrode 124 and the second gate electrode 125 connected to the same gate line 122 control different pixel regions. In other words, when the first gate electrode 124 connected to the n−1th gate line 122 controls the n−1th pixel region, the second gate electrode 125 connected to the n−1th gate line 122 controls the n−2th pixel region (previous pixel region). The second gate electrode 125 controlling the n−1th pixel region is connected to the nth gate line 122.

In an embodiment of the present invention, a storage electrode line 128 is formed on the same layer as the gate line 122. The storage electrode line 128 may be formed in various sizes and shapes. For example, the storage electrode line 128 may include two vertical parts parallel to a data line 161, an extended part extended from the vertical part and the oblique parts connecting between both vertical parts.

A gate insulating layer 130, which may be made of silicon nitride SiNx, silicon oxide SiOx, and so on, is formed on the gate line 122 and the storage line 128. The first and the second semiconductor layers 141, 142 are formed on the gate insulating layer 130 and the first and the second semiconductor layers 142, 143 may be made of hydrogenated amorphous silicon. The first semiconductor layer 141 is overlapped with the first gate electrode 124 and the second semiconductor layer 142 is overlapped with the second gate electrode 125.

Ohmic contact layers 155, 156, 157, 158, 159 are formed on the first and the second semiconductor layers 141, 142. The ohmic contact layers 155, 156, 157, 158, 159 are interposed between the first and the second semiconductor layers 141,142 and source electrodes 162, 165, 167, drain electrodes 163, 164, 166 to reduce the contact resistance there between.

A data wire 161, 162, 163, 164, 165, 166, 167, 168 is formed on the ohmic contact layers 155, 156, 157, 158, 159. A data wire 161, 162, 163, 164, 165, 166, 167, 168 includes the data line 161, the first source electrode 162, the first drain electrode 163, the second drain electrode 164, the second source electrode 165, the third drain electrode 166, the third source electrode 167 and the fourth drain electrode 168.

Data line 161 intersects gate line 122. The first source electrode 162, the first drain electrode 163, the second drain electrode 164, the second source electrode 165 and the third drain electrode 166 are formed at the n−1th pixel region. The first source electrode is connected to the data line 161 and branches out from the data line 161. The first and the second drain electrode 163, 164 face the first source electrode 162. The second source electrode 165 is electrically connected to the second sub pixel electrode 182. The third drain electrode 166 faces the second source electrode 165.

The first source electrode 162, the first and the second drain electrode 163, 164 overlap with the first gate electrode 124 and the second source electrode 165 and the third drain electrode 166 overlap with the second gate electrode 125. In an embodiment of the present invention, the first source electrode 162 facing the first and the second drain electrode 163, 164 may include two parts being apart from each other and the first gate electrodes 124 may include two parts being apart from each other.

The third drain electrode 166 includes an extended part **166*a* overlapped with the storage electrode line 128. The extended part 166*a* of the third drain electrode 166 may be overlapped with the first sub pixel electrode 181. The extended part 166*a* and the storage electrode line 128 overlaps with the extended part 166*a* forming a voltage down capacitor to lower a voltage level of the second sub pixel electrode 182. The extended part 166*a* and the first sub pixel electrode 181 overlaps with the extended part 166*a* forming a voltage up capacitor to increase a voltage level of the first sub pixel electrode 181. Though the first and the second pixel electrodes 181, 182 receive the same voltage, the voltage between the first and the second pixel electrode 181, 182** is different.

The first TFT includes the first gate electrode 124 of the n−1th gate line, the first source electrode 162, the first drain electrode 177 and the first semiconductor layer 141 and the second TFT includes the first gate electrode 124 of the n−1th gate line, the first source electrode 162, the second drain electrode 176, and the first semiconductor layer 141. The third TFT includes the second gate electrode 125 of the nth gate line, the second source electrode 165, the third drain electrode 166 and the second semiconductor layers 142. To control one pixel region, the second gate electrode 125 of the third TFT is connected to the next gate line 122.

The third source electrode 167, and the fourth drain electrode 168 are formed at the nth pixel region. The third source electrode 167 is electrically connected to the data line 161 and is formed on the first gate electrode 124 which is connected to the nth gate line 122. The fourth drain electrode 168 faces the third source electrode 167. The fourth drain electrode 168 is electrically connected to the third sub pixel electrode 183 and overlaps with at least one portion of the fourth sub pixel electrode 184 to form the coupling capacitor (Ccp). The fourth drain electrode 168 includes the first extended part 168*a* which is electrically connected to the first sub pixel electrode 183, an oblique part overlapped with an aperture of a common electrode 250 and the second extended part 168*b* formed at the center of the pixel region.

The fourth TFT includes the first gate electrode 124 of the nth gate line 122, the third source electrode 167, the fourth drain electrode 168 and the first semiconductor layer 141. To control the nth pixel region, the fourth TFT controlled by the nth gate line is used, but the other TFT controlled by the n+1th gate line is not used.

A passivation layer 170 is formed on the data wire 161, 162, 163, 164, 165, 166, 167, 168. The passivation layer 170 may be made of an organic material or inorganic material such as silicon nitride and may be formed as two layers. The passivation layer 170 includes contact holes 176, 177, 178, 179 to expose the first and the second drain electrode 163, 164, the second source electrode 165 and the third drain electrode 168.

The pixel electrodes 181, 182, 183, 184 are formed on the passivation layer 170. The pixel electrodes 181, 182, 183, 184 include the first and the second sub pixel electrodes 181, 182 formed at one pixel region and the third and the fourth sub pixel electrodes 183, 184 formed at the other pixel region. The pixel electrodes 181, 182, 183, 184 may be made of transparent conducting material such as Indium-Tin-Oxide (ITO), Indium-Zinc-Oxide (IZO).

The first sub pixel electrode 181 is connected to the first drain electrode 163 through the contact hole 176 and overlaps with the storage electrode line 128. The second sub pixel electrode 182 is connected to the second drain electrode 164 and the second source electrode 165 through the contact holes 177, 178 and overlaps with the other side of vertical part of the storage electrode line 128. An aperture 185 extends in a substantially horizontal direction and is formed at the center of the second sub pixel electrode 182. A space 186 is formed between the first sub pixel 181 and the second sub pixel electrode 182. The space 186 is obliquely formed to the horizontal direction and overlaps with the oblique portion of the storage electrode line 128. The third sub pixel electrode 183 is connected to the fourth drain electrode 168 through the contact hole 179. The fourth sub pixel electrode 184 partially overlaps the fourth drain electrode 168 with an interposing passivation layer 170 there between. The shape and the disposition of the third and fourth sub pixel electrode 183, 184 are similar to the first and the second sub pixel electrode 181, 182.

The alignment layer (not shown) may be formed on the pixel electrode 181, 182, 183, 184. In an embodiment of the present invention, a vertical alignment layer may be used.

When the first and second TFT of the n−1th gate line turn on, the first sub pixel electrode 181 and the second sub pixel electrode 182 receive the same data voltage from the data line 161. But when the third TFT of the nth gate line turns on, the voltage level of the first sub pixel electrode 181 is high and the voltage level of the second sub pixel electrode 182 is low. When the fourth TFT of the nth gate line turns on, the third sub pixel electrode 183 receives the data voltage from the data line 161 and the fourth sub pixel electrode 184 receives the voltage through coupling capacitor (Ccp). Thus the voltage level of the fourth sub pixel electrode 184 is lower than the voltage level of the third sub pixel electrode 183. Because different voltages are applied to each of the sub pixel electrodes in one pixel region, the distortion of the gamma curve may be decreased and the visibility of the display device may be improved. Also, the problem of having pixel electrodes of the last line being brighter than other pixel electrodes may be solved.

Referring again to FIG. 4, FIG. 5 and FIG. 6, a common electrode panel of an embodiment of the present invention will now be described in detail.

The common electrode panel 200 includes the second substrate 210 facing the first substrate 210. The second substrate 210 may be made of transparent glass or plastic. A blocking layer 220 is formed on the second substrate 210. The blocking layer 220 may overlap the region defined by the gate lines 122 and the data lines 161. A color filter 230 is formed at the region encompassed by the blocking layer 220 but the color filter 230 may be formed on the TFT array panel 100.

An Overcoating layer 240 is formed on the blocking layer 220 and the color filter layer 230. A common electrode 250 is formed on the overcoating layer 240 and the common electrode 250 may be made of ITO or IZO and so on. To form the domain region, apertures 253, 254, 255 are formed at the common electrode 250. Upper and lower apertures 253, 255 are overlapped with the first sub pixel electrode 181 and are obliquely formed to the horizontal direction. At the edge of the first sub pixel electrode 181, the upper and the lower apertures 253, 255 parallel the gate line 122 or the data line 161, and the upper and the lower apertures 253, 255 are substantially symmetrical to the virtual center line of the pixel region.

The apertures 253, 254, 255 of the common electrode 250 and the space 186 between two sub pixel electrodes 181, 182 of the TFT array panel 100 and the apertures 186 of the second sub pixel electrode 182 generate a fringe field and define a domain region of LC. In an embodiment of the present invention, the apertures are used to form the domain region but the protrusion may be also used to form the domain region and the additional domain forming element may be formed on the TFT array panel 100 or the common electrode panel 200.

An alignment layer (not shown) may be formed on the common electrode 250.

Figure 5:
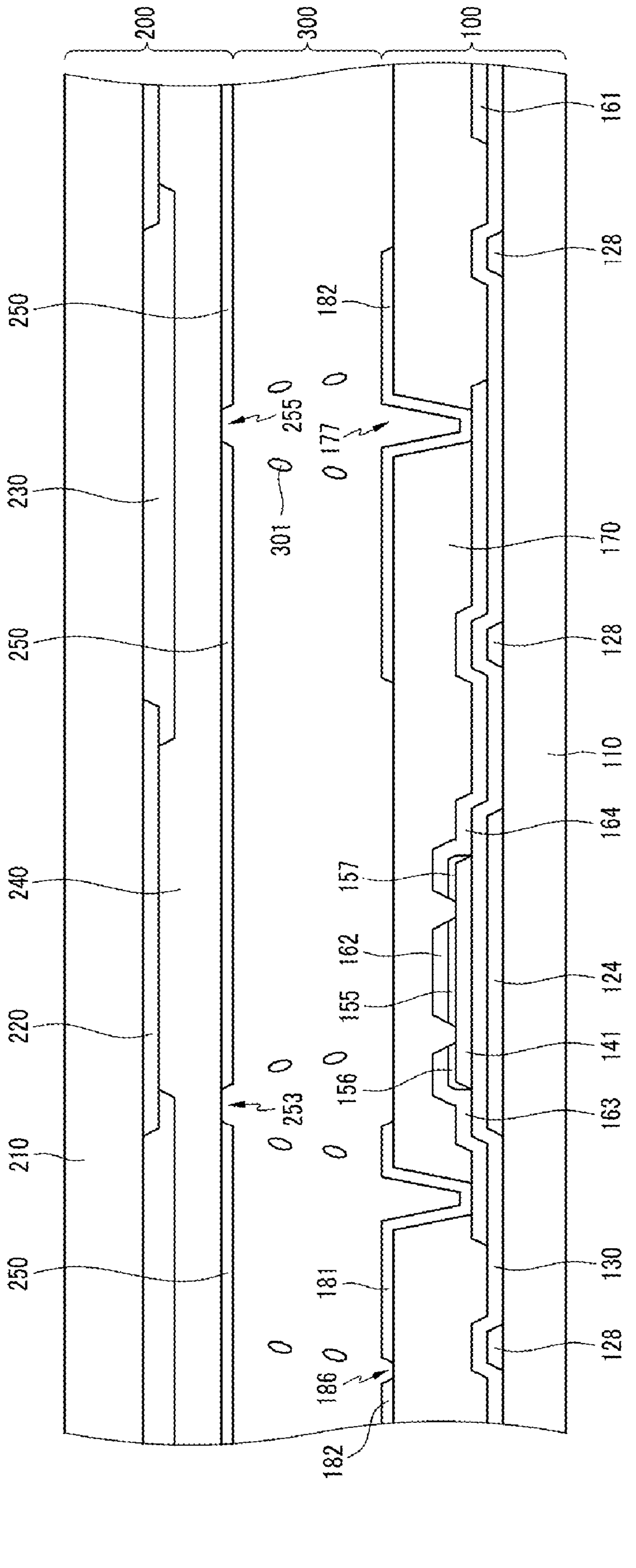
FIG. 5 is a cross-sectional view taken along the line I-I of the display device of FIG. 4.
Figure 6:
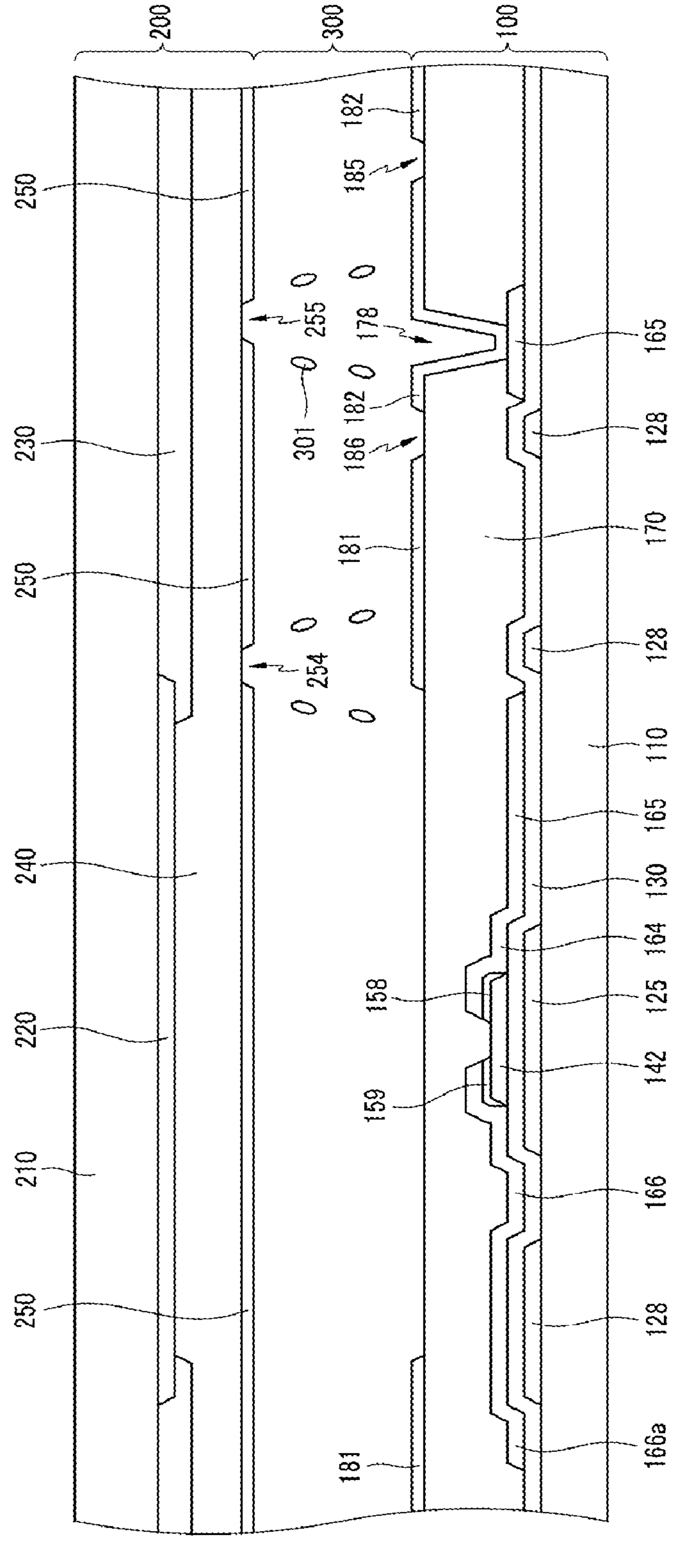
FIG. 6 is a cross-sectional view taken along the line II-II of the display device of FIG. 4.

Referring to FIG. 4, FIG. 5 and FIG. 6, a liquid crystal layer 300 is interposed between the TFT array panel 100 and the common electrode panel 200. The liquid crystal layer 300 includes a plurality of liquid crystal molecules 301.

When a voltage is not applied to the electrodes, the liquid crystal molecules 301 are vertically aligned to the first and second substrate 110, 210. When the voltage is applied to the electrodes, the electric field is generated and the liquid crystal molecules 301 are re-arranged. The polarizers (not shown) and liquid crystal molecules 301 control the amount of light transmittance.

As described above, the visibility of the display device may be improved and the pixel electrodes of the last line may not show brighter than the pixel electrodes of other lines.

While embodiments of the present invention have been described in detail above, it will be understood by those skilled in the art that various changes in form and details may be made therein without departing from the spirit and scope of the present invention. For example, although the present invention was described above based on four processes, the present invention can be used for three processes. Accordingly, the scope of the invention is defined only by the following appended claims.

What is claimed is:

1. A thin film transistor (TFT) array panel, comprising:

a substrate;

an n−1th and an nth gate line formed on the substrate;

a data line intersected with the n−1th gate line;

a first TFT including at least a portion of the n−1th gate line;

a second TFT including at least a portion of the n−1th gate line;

a first sub pixel electrode electrically connected to the first TFT;

a second sub pixel electrode electrically connected to the second TFT;

a first source electrode overlapped with at least one portion of the nth gate line and electrically connected to the second sub pixel electrode;

a first drain electrode overlapped with at least one portion of the nth gate line and facing the first source electrode;

a second source electrode overlapped with at least one portion of the nth gate line;

a second drain electrode facing the second source electrode;

a third sub pixel electrode electrically connected to the second drain electrode; and a fourth sub pixel electrode capacitively coupled with the third sub pixel electrode.

2. The TFT array panel of claim 1, further comprising a storage electrode line formed on the substrate, wherein the first drain electrode overlaps with at least one portion of the storage electrode line and the first drain electrode overlaps with at least one portion of the first sub pixel electrode.

3. The TFT array panel of claim 2, wherein an overlapping area between the first drain electrode and the first sub pixel electrode forms voltage up capacitor and an overlapping area between the first drain electrode and the storage electrode line forms voltage down capacitor.

4. The TFT array panel of claim 2, wherein the fourth sub pixel electrode is overlapped with at least one portion of the second drain electrode.

5. The TFT array panel of claim 1, wherein the nth gate line controls pixel electrodes of the last line.

6. The TFT array panel of claim 1, wherein the storage electrode line comprises an oblique portion and the first sub pixel electrode separates from the second sub pixel electrode at the oblique portion.

7. The TFT array panel of claim 6, wherein a space between the first sub pixel electrode and the second sub pixel electrode forms to make multi domain region.

8. A display device, comprising:

a first substrate;

an n−1th and an nth gate line formed on the first substrate;

a first source electrode overlapped with at least one portion of the n−1th gate line and connected to data line;

a first and a second drain electrode overlapped with at least one portion of the n−1th gate line and facing the first source electrode;

a first sub pixel electrode electrically connected to the first drain electrode;

a second sub pixel electrode electrically connected to the second drain electrode;

a second source electrode overlapped with at least one portion of the nth gate line and electrically connected to the second sub pixel electrode;

a third drain electrode overlapped with at least one portion of the nth gate line and facing the second source electrode;

a third source electrode overlapped with at least one portion of kth gate line;

a fourth drain electrode overlapped with at least one portion of the kth gate line and facing the third source electrode;

a third sub pixel electrode electrically connected to the fourth drain electrode;

a fourth sub pixel electrode capacitively coupled with the third sub pixel;

a second substrate facing the first substrate; and a common electrode formed on the second substrate.

9. The display device of claim 8, wherein the kth gate line controls pixel electrodes of the last line.

10. The display device of claim 9, number k and n is natural number and the number k and n is same.

11. The display device of claim 8, wherein at least one portion of the fourth sub pixel electrode is overlapped with the fourth drain electrode.

12. The display device of claim 11, further comprising storage electrode line formed on the first substrate, wherein the third drain electrode is overlapped with at least one portion of the storage electrode line and at least one portion of the first sub pixel electrode.

13. The display device of claim 12, wherein overlapping area between the third drain electrode and the first sub pixel electrode forms voltage up capacitor and overlapping area between the third drain electrode and the storage electrode line formed voltage down capacitor.

14. The display device of claim 8, the common electrode comprises domain forming elements.

15. The display device of claim 14, the domain forming elements comprise stem portion oblique to the gate line and trunk portion substantially parallel to the gate line.

16. The display device of claim 15, wherein the second sub pixel electrode comprises the domain forming elements and the domain forming elements substantially parallel to the gate line.

17. The display device of claim 15, at least one portion of the first sub pixel electrode is chamfered.

18. The display device of claim 8, wherein the source electrode comprises the first and the second parts and the first part facing the first drain electrode, and the second part facing the second drain electrode.

19. A display device, comprising:

a first substrate;

an n−1th and an nth gate line formed on the first substrate;

a first and a second thin film transistor (TFT) controlled by the n−1th gate line;

a third TFT controlled by the nth gate line;

a fourth TFT controlled by the nth gate line;

a first sub pixel electrode electrically connected to the output of the first TFT;

a second sub pixel electrode electrically connected to an output of the second TFT and an input of the third TFT;

a third sub pixel electrode electrically connected to an output of the fourth TFT;

a fourth sub pixel electrode capacitively coupled with the third sub pixel electrode;

a second substrate; and a liquid crystal layer interposed between the first and the second substrate.

20. The display device of claim 19, a source electrode of the first TFT is connected with a source electrode of the second TFT.

* * * * *